United States Patent

[11] 3,577,772

[72] Inventors Jean Perill
 Bourg La Reine;
 Michel Joseph Auphan, Neuilly sur Seine,
 France
[21] Appl. No. 637,000
[22] Filed May 8, 1967
[45] Patented May 4, 1971
[73] Assignees U. S. Philips Corporation
 New York, N.Y.;
[32] Priority May 6, 1966
[33] France
[31] 60559

[54] DEVICE FOR DIAGNOSTIC EXAMINATION BY ULTRASONIC OSCILLATIONS
 8 Claims, 1 Drawing Fig.

[52] U.S. Cl. ........................................................ 73/67.7,
 128/2
[51] Int. Cl. ............................................................. G01n 29/04

73/67.5-
 —67.9; 128/2; 310/9.1;

[56] References Cited
 UNITED STATES PATENTS
 3,332,278 7/1967 Wood et al. .................. 73/67.7
 3,442,579 5/1969 Friedberg ..................... 73/67.7X

*Primary Examiner*—Charles A. Ruehl
*Attorney*—Frank R. Trifari

ABSTRACT: An ultrasonic device for examining the internal parts of the body comprising a plurality of ultrasonic transmitters mounted along a horizontal line on a movable carriage and triggered sequentially. A plurality of receivers is mounted on the carriage along a vertical line that intersects the horizontal line at right angles. The movement of the carriage is synchronized with the deflection of an electron beam in a PPI cathode-ray tube to provide a visual display of the surface contour of the internal body part under investigation.

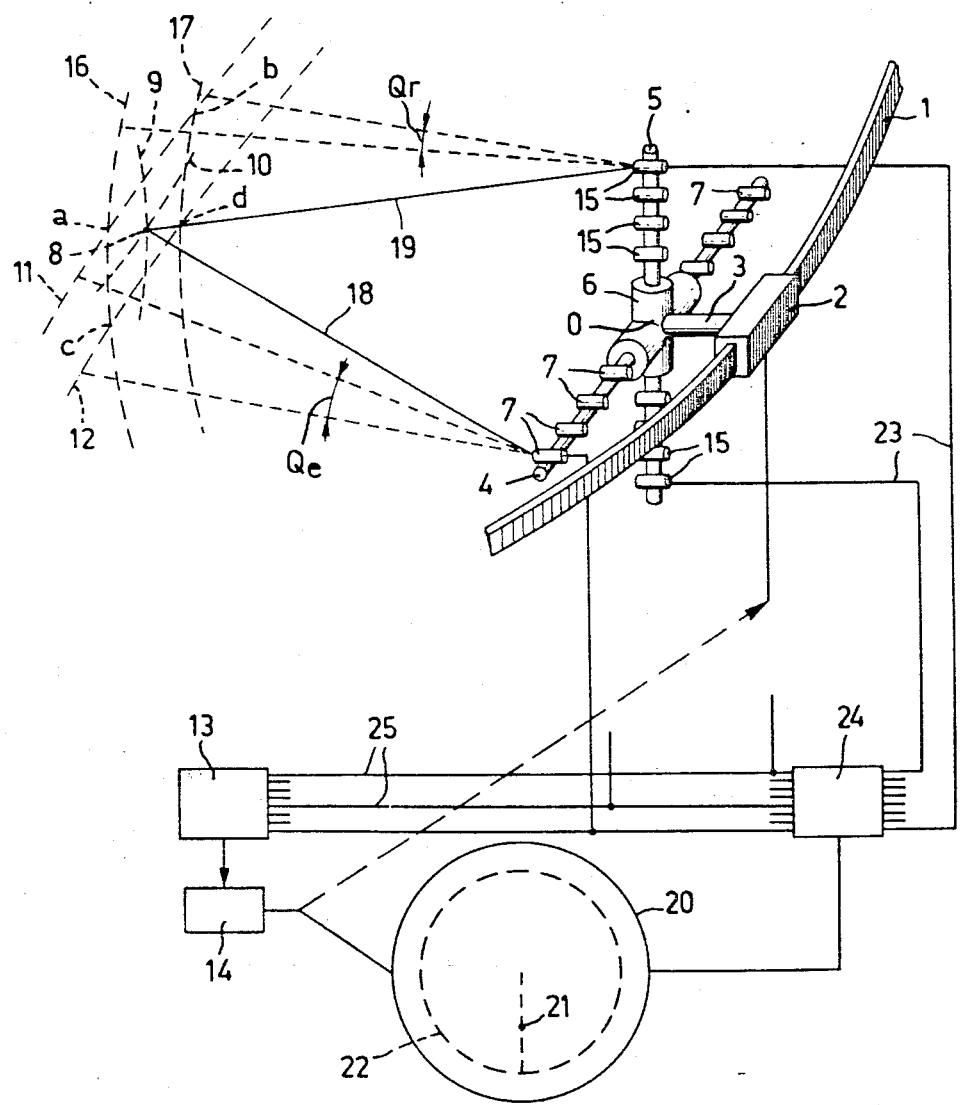

DEVICE FOR DIAGNOSTIC EXAMINATION BY ULTRASONIC OSCILLATIONS

The present invention relates to a device for diagnostic examination by means of ultrasonic oscillations. More particularly, the invention relates to a diagnostic apparatus in which the oscillations are employed for recording surface forms, especially for echo observation of irregularly curved surfaces for topographical study of internal body parts.

It is known to examine internal body parts by means of ultrasonic oscillations which strike the reflecting surface in a directed, narrow beam. The required ultrasonic transmitter is displaced along a given path and, if necessary, turned about one or more axes. The rectilinear movement in two directions and the scan of a surface by the transmitter along a circular path during the oscillation of the transmitter around a central point, are considered to be necessary to capture the reflections from curved, reflecting surfaces, while the sound transmitter is moved as closely as possible along the outer surface of the body examined.

In order to avoid apparent reflections and inaccuracies in the topography due to differences in refractive indices, a liquid layer of appropriate composition is maintained between the ultrasonic transmitter and the surface of the body.

The mechanical construction of a device suitable for determining the spot of internal body parts in this way is particularly complicated and expensive.

The invention has for an object to avoid this disadvantage. According to the invention the ultrasonic transmitter is formed by a plurality of separate sources of ultrasonic oscillations arranged in a flat plane along a straight or a curved line and adapted to produce a sequence of ultrasonic waves of short duration in narrow beams directed to the body organ to be examined. In a plane at right angles to the plane of the transmitters there is arranged a plurality of receivers along a line which intersects the line of the transmitters.

One embodiment of the device according to the invention will be described hereinafter with reference to the accompanying drawing which is a diagrammatic illustration of an apparatus for carrying out the invention.

The diagnostic device comprises a guide path 1 which is supported in a manner not shown and along which a carriage 2 is adapted to be displaced. By means of an arm 3 a cross-shaped supporting frame 6 is connected with the carriage 2 for fixing two supports 4 and 5 located in orthogonal planes. The supports 4 and 5 may be straight, but one or both of them may be curved to a greater or lesser extent if this is desired for a particular kind of examination. In the device shown, which may be used for the examination of the skull of a patient, the supports are straight. The guide path 1 is curved and approximately matches the shape of the head.

Along the support 4, located in the horizontal plane, a plurality of ultrasonic transmitters 7 are arranged. The transmitters connected with the support 4 so that their direction of radiation passes towards a point 8 inside the skull, the position of which point is considered to contribute to the topography of an internal organ. The lines 9 and 10 are an approximate indication of such an organ.

The ultrasonic beam produced by the transmitters 7 propagates in a narrow angle $\Phi_e$, which is indicated on the drawing on an enlarged scale. When the carriage 2 is displaced along the guide path 1 the beams scan a linear region between the limits 11 and 12.

The transmitters 7 are successively actuated for a short time by an electric pulse generator 13, which may be formed by known electric pulse circuits in conjunction with a distributor for applying the pulses produced in sequence to the various transmitters. The pulse sequences are repeated during the movement of the carriage 2 with the supports 4 and 5 along the guide path 1. This movement is controlled by a control-member 14 which regulates the speed of the carriage 2. The repetition frequency is chosen in accordance with the desired accuracy of the measuring results of each pulse sequence in dependence upon the displacement of the carriage in the course of each pulse sequence.

The arm 5, which is located in the vertical plane, has a plurality of receivers 15 adapted to capture reflected radiation from a reflecting surface located in the space angle $\Phi_r$. This angle, which is also shown on an enlarged scale, is limited by the lines 16 and 17. The angles $\Phi_e$ and $\Phi_r$ are preferably so small that the surface abcd between the limits 11—12 and 16—17 has substantially the shape of a point, which is indicated by the reflecting point 8. The central rays 18 and 19 of a transmitted sound wave and of a sound echo at point 8 connect this point with one of the transmitters 7 and one of the receivers 15. The location of the reflecting surface determines which of the receivers 15 will capture the sound wave of one of the transmitters 7 during a series of transmitted sound waves.

In order to provide topographical definition of the point 8, use is made of the known speed of propagation of ultrasonic waves through living tissue and the duration of time before a transmitted sound wave is received as an echo. This transit time of the ultrasonic wave is directly proportional to the sum of the distances along the paths 18 and 19 of the central beam, which may be determined by means of the displacement of a spot on the screen of a cathode-ray tube 20. In this case, the electron beam is controlled in a suitable manner, for example, across the screen of a cathode-ray tube so that the beam is cyclically deflected and the spot moves along successive radii. In the presence of an echo signal a control voltage is applied to the control electrode of the cathode ray system so that a spot 21 of greater brightness is produced. The distance of the spot 21 from the limit 22 of the surface scanned by the beam is proportional to the lapse of time between the transmission and the reception of a sound wave.

Echo signals, captured in order of succession, are reproduced along different radii on the screen 20 since the control-member 14 controls not only the movement of the carriage 2 along the guide path 1 but also the deflection of the electron beam. As a result the direction of deflection of the beam varies synchronously with the displacement of the carriage.

The echo signals of the receivers 15 are applied along separate conductors 23 to a computer 24, whereas the control pulses for the transmitters 7 are supplied along the conductors 25. A number of invariable data, such as the distances of each of the transmitters 7 from the center O of the cross-shaped supporting member 6 and of each of the receivers 15 from said center, can be stored in the computer 24.

The computer therefore serves for determining, at the reception of an echo signals, the length of the path of the sound wave from the relevant transmitter to the receiver capturing the echo concerned. This is done by a calculation utilizing the known speed of propagation and the measured time.

According to the equation:

$$\text{position of point } 8 = 1/2\sqrt{L^4 - 2L^2(a^2+^2) + (a^2-b^2)^2},$$

The position of point 8 of an internal organ with respect to the center O can be determined from the length of the path found, in which:

L = the sum of the distances 18 and 19,
a = the distance of the relevant transmitter from the center O,
b = the distance of the receiver of the echo signal from the center O.

This equation can be derived by trigonometrical measurement.

We claim:

1. A device for examining internal body parts by means of ultrasonic waves comprising, ultrasonic transmitter means mounted for movement along the surface of the body, said ultrasonic transmitter means comprising a plurality of separate transmitters of ultrasonic oscillations arranged in a flat plane along a straight or curved line, control means for triggering said separate transmitters in sequence to produce sequentially ultrasonic waves of short duration in narrow beams directed to the body part to be examined, and a plurality of receivers arranged in a plane at right angles to the plane of the sound transmitters along a line which intersects the line of the sound transmitter, said receivers being mounted for movement with said transmitters along the surface of the body so as to intercept the ultrasonic waves propagating through the body after being reflected from the surface of the body part under examination.

2. A device as claimed in claim 1 further comprising, a carriage member mounted for movement along a given guide path, a cross-shaped support member mounted on said carriage, and first and second support arms fastened on said cross-shaped support members, said transmitters and receivers being mounted on said first and second support arms, respectively.

3. A device as claimed in claim 2, characterized in that the guide path has a curved shape matching the curvature of the surface of the body having the organ to be examined.

4. A device as claimed in claim 2 further comprising a control member including means for displacing the carriage with the transmitters and receivers along said guide path, and said control means includes a control-system for repeating the sequential triggering of the transmitters during the displacement of the carriage.

5. A device as claimed in claim 1, characterized in that the repetition frequency of said control means is variable.

6. A device as claimed in claim 1 wherein said control means comprises, an electronic pulse generator, and a pulse distributor selectively interconnecting the output of said pulse generator with said separate transmitters.

7. A device as claimed in claim 6 further comprising, means for moving said transmitters and receivers, a cathode ray tube with means for radially deflecting the electron beam across the display screen, a control member having its input coupled to the output of the pulse generator and a first output for controlling said moving means and thereby the movement of said transmitters and receivers and a second output for controlling the sweep of the cathode ray tube beam in synchronism with the movement of said transmitter and receivers.

8. A device as claimed in claim 6 further comprising computer means coupled to the outputs of the pulse distributor and the outputs of said receivers and including means for determining the distance between a point on the surface of the internal body part that reflects the ultrasonic energy from a transmitter and the intersection point of said line of transmitters and said line of receivers by analyzing the transit time of the ultrasonic energy from a given transmitter to a given receiver.